(12) United States Patent (10) Patent No.: US 8,630,542 B2
Bernstein et al. (45) Date of Patent: *Jan. 14, 2014

(54) DISTRIBUTING WAVELENGTH COMPATIBLE WITH SIGNALING PROTOCOLS

(75) Inventors: Greg Bernstein, Fremont, CA (US); Young Lee, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/491,288

(22) Filed: Jun. 7, 2012

(65) Prior Publication Data

US 2012/0243870 A1 Sep. 27, 2012

Related U.S. Application Data

(63) Continuation of application No. 12/177,368, filed on Jul. 22, 2008, now Pat. No. 8,238,749.

(60) Provisional application No. 60/968,191, filed on Aug. 27, 2007.

(51) Int. Cl.
*H04J 14/02* (2006.01)

(52) U.S. Cl.
USPC .............................. 398/69; 398/49

(58) Field of Classification Search
USPC ............................... 398/48–49, 69
See application file for complete search history.

(56) References Cited

U.S. PATENT DOCUMENTS

| 7,286,759 | B1 | 10/2007 | Sridhar et al. |
| 7,362,974 | B2* | 4/2008 | De Patre et al. ............... 398/50 |
| 7,525,919 | B2 | 4/2009 | Matsui et al. |
| 7,630,635 | B1 | 12/2009 | Guy et al. |
| 7,643,751 | B2 | 1/2010 | Sone et al. |
| 7,715,716 | B2 | 5/2010 | Risbood |
| 7,983,558 | B1* | 7/2011 | Gerstel et al. .................. 398/25 |
| 8,145,056 | B2* | 3/2012 | Bernstein et al. ............... 398/48 |
| 2003/0198227 | A1 | 10/2003 | Matsuura et al. |
| 2004/0208433 | A1 | 10/2004 | Cho et al. |
| 2005/0078659 | A1* | 4/2005 | Ashwood Smith ........... 370/352 |

(Continued)

FOREIGN PATENT DOCUMENTS

| CN | 1362806 A | 8/2002 |
| CN | 1924370 A | 3/2007 |

OTHER PUBLICATIONS

Bradner, S., "Key Words for Use in RFCs to Indicate Requirement Levels," RFC 2119, Mar. 1997.

(Continued)

*Primary Examiner* — Leslie Pascal
(74) *Attorney, Agent, or Firm* — Conley Rose, P.C.; Grant Rodolph; Brandt D. Howell (57) ABSTRACT

An apparatus, comprising a first node configured to communicate with a second node to generate a wavelength assignment, wherein the first node is configured to send a wavelength availability information to the second node. Included is a network component comprising at least one processor configured to implement a method, comprising receiving a wavelength availability information, and updating the wavelength availability information using a local wavelength availability information. Also included is a method, comprising acquiring a local wavelength assignment information, calculating a local wavelength availability information, and transmitting the local wavelength availability information to a subsequent network element on a lightpath.

17 Claims, 6 Drawing Sheets

(56) References Cited

U.S. PATENT DOCUMENTS

| | | |
|---|---|---|
| 2005/0141437 A1 | 6/2005 | Burnett et al. |
| 2006/0209785 A1 | 9/2006 | Iovanna et al. |
| 2007/0092256 A1 | 4/2007 | Nozue et al. |
| 2007/0172237 A1 | 7/2007 | Risbood |
| 2010/0221007 A1 | 9/2010 | Sakamoto et al. |
| 2011/0091213 A1 | 4/2011 | Kawaza et al. |

OTHER PUBLICATIONS

McCloghire, K., et al., "Structure of Management Information Version 2 (SMIv2)," RFC 2578, Apr. 1999.

Awduche, D., et al., "RSVP-TE: Extensions to RSVP for LSP Tunnels," RFC 3209, Dec. 2001.

Berger, L., "Generalized Multi-Protocol Label Switching (GMPLS) Signaling Functional Description," RFC 3471, Jan. 2003.

Berger, L., "Generalized Multi-Protocol Label Switching (GMPLS) Signaling Resource Reservation Protocol-Traffic Engineering (RSVP-TE) Extensions," RFC 3473, Jan. 2003.

Kompella, K., et al., "Signalling Unnumbered Links in Resource Reservation Protocol—Traffic Engineering (RSVP-TE)," RFC 3477, Jan. 2003.

Farrel, A., et al., "Encoding of Attributes for MPLS LSP Establishment Using Resource Reservation Protocol Traffice Engineering (RSVP-TE)," RFC 5420, Feb. 2009.

Mannie, E., et al., "Recovery (Protection and Restoration) Terminology for Generalized Multi-Protocol Label Switching (GMPLS)," RFC 4427, Mar. 2006.

Bernstein, G., et al., "Applicability of GMPLS and PCE to Wavelength Switched Optical Networks," draft-bernstein-ccamp-wavelength-switched-00.txt, Jun. 25, 2007.

Bernstein, G., et al., "Framework for GMPLS and PCE Control of Wavelength Switched Optical Networks," draft-bernstein-ccamp-wavelength-switched-03.txt, Feb. 19, 2008.

Xu, Sugang, et al., "Extensions to GMPLS RSVP-TE for Bidirectional Lightpath with the Same Wavelength," draft-xu-rsvpte-bidir-wave-00, Jun. 2007.

Xu, Sugang, et al., "Extensions to GMPLS RSVP-TE for Bidirectional Lightpath with the Same Wavelength," draft-xu-rsvpte-bidir-wave-01, Nov. 12, 2007.

Winzer, Peter J., et al., "Advanced Optical Modulation Formats," Proceedings of the IEEE, vol. 94, May 2006, pp. 952-985.

Series G: Transmission Systems and Media, Digital Systems and Networks, Digital Sections and Digital Line System—Digital Line Systems, Optical Transport Network Physical Layer Interfaces, ITU-T G.959.1, Mar. 2006, 57 pages.

Series G: Transmission Systems and Media, Digital Systems and Networks, Transmission Media Characteristics—Characteristics of Optical Components and Subsystems, Spectral Grids for WDM Applications: DWDM Frequency Grid, ITU-T G.694.1, Jun. 2002, 11 pages.

Series G: Transmission Systems and Media, Digital Systems and Networks, Transmission Media Characteristics—Characteristics of Optical Components and Subsystems, Spectral Grids for WDM Applications: CWDM Wavelength Grid, ITU-T G.694.2, Dec. 2003, 10 pages.

Series G: Transmission Systems and Media, Digital Systems and Networks, Transport of IEEE 10G base-R in Optical Transport Networks (OTN), ITU-T Series G Supplement 43, Nov. 2006, 15 pages.

Lang, J.P., et al., "RSVP-TE Extensions in Support of End-to-End Generalized Multi-Protocol Label Switching (GMPLS) Recovery," RFC 4872, May 2007.

Papadimitriou, D., "Generalized Multi-Protocol Label Switching (GMPLS) Signaling Extensions for G.709 Optical Transport Networks Control," RFC 4328, Jan. 2006.

Farrel, A., et al., "Encoding of Attributes for Multiprotocol Label Switching (MPLS) Label Switched Path (LSP) Establishment Using Resource Reservation Protocol-Traffic Engineering (RSVP-TE)," RFC 4420, Feb. 2006.

Mannie, E., et al., "Generalized Multi-Protocol Label Switching (GMPLS) Extensions for Synchronous Optical Network (SONET) and Synchronous Digital Hierarchy (SDH) Control," RFC 4606, Aug. 2006.

Otani, T., et al., "Generalized Labels of Lambda-Switching Capable Label Switching Routers (LSR)," draft-otani-ccamp-gmpls-lambda-labels-00.txt, Jun. 2007.

Otani, T., et al., "Generalized Labels of Lambda-Switching Capable Label Switching Routers (LSR)," draft-otani-ccamp-gmpls-lambda-labels-02.txt, Feb. 24, 2008.

Ji, Yuefeng, et al., "MSWS Method to Support Shared-Mesh Restoration for Wavelength Switched Optical Networks," draft-ji-ccamp-wson-msws.00.txt, Jul. 29, 2008.

Series G: Transmission Systems and Media, Digital Systems and Networks, Digital Terminal Equipments—General, Series Y: Global Information Infrastructure, Internet Protocol Aspects and Next Generation Networks, Internet Protocol Aspects—Transport, Interfaces for the Optical Transport Network (OTN), ITU-T G.709/Y.1331, Mar. 2003, 118 pages.

Series G: Transmission Systems and Media, Digital Systems and Networks, Digital Sections and Digital Line System—Optical Fibre Submarine Cable Systems, Forward Error Correction for High Bit-Rate DWDM Submarine Systems, ITU-T G.975.1, Feb. 2004, 58 pages.

Andriolli, N., et al., "Label Preference Schemes in GMPLS Controlled Networks," IEEE Communications Letters, vol. 10, Dec. 2006, pp. 849-851.

Bernstein, et al., "Signaling Extensions for Wavelength Switched Optical Networks," draft-bernstein-ccamp-wson-signaling-00.txt, Apr. 2008, 32 pages.

Bernstein, et al., "Signaling Extensions for Wavelength Switched Optical Networks," draft-bernstein-ccamp-wson-signaling-02.txt, Jul. 7, 2008, 24 pages.

Bernstein, G., Ed., et al., "Framework for GMPLS and PCE Control of Wavelength Switched Optical Networks (WSON)," draft-ietf-ccamp-wavelength-switched-framework-00.txt, May 13, 2008, 68 pages.

Bernstein, G., et al., "Routing and Wavelength Assignment Information Encoding for Wavelength Switched Optical Networks," draft-bernstein-ccamp-wson-encode-00.txt, Jul. 3, 2008, 42 pages.

Foreign Communication From a Related Counterpart Application—International Search Report and Written Opinion, PCT/CN2008/072099, Nov. 20, 2008, 6 pages.

Zang, Hui, et al., "A Review of Routing and Wavelength Assignment Approaches for Wavelength-Routed Optical WDM Networks," Optical Networks Magazine, Jan. 2000, pp. 47-60.

Giorgetti, A., et al., "Label Preference Schemes for Lightpath Provisioning and Restoration in Distributed GMPLS Networks," Journal of Lightwave Technology, vol. 27, No. 6, Mar. 15, 2009, 10 pages.

Berger, L., et al., "Usage of the RSVP Association Object," draft-ietf-ccamp-assoc-info-00.txt, Oct. 14, 2010, 22 pages.

Bernstein, G., Ed., et al., "Framework for GMPLS and PCE Control of Wavelength Switched Optical Networks," draft-bernstein-ccamp-wavelength-switched-01.txt, Sep. 13, 2007, 66 pages.

Bernstein, G., Ed., et al., "Framework for GMPLS and PCE Control of Wavelength Switched Optical Networks," draft-bernstein-ccamp-wavelength-switched-02.txt, Oct. 25, 2007, 68 pages.

Bernstein, G., et al., "WSON Signal Characteristics and Network Element Compatibility Constraints for GMPLS," draft-bernstein-ccamp-wson-signal-00.txt, May 21, 2009, 30 pages.

Lee, Y., et al., "OSPF Enhancement for Signal and Network Element Compatibility for Wavelength Switched Optical Networks," draft-lee-ccamp-wson-signal-compatibility-ospf-00.txt, Oct. 12, 2009, 16 pages.

Otani, T., et al., "Generalized Labels of Lambda-Switching Capable Label Switching Routers (LSR)," draft-otani-ccamp-gmpls-lambda-labels-01.txt, Nov. 15, 2007, 11 pages.

Zhang, F., et al., "RSVP-TE Extentions to Realize Dynamic Binding of Associated Bidirectional LSP," draft-zhang-mpls-tp-rsvpte-ext-associated-lsp-00.txt, Mar. 1, 2010, 10 pages.

(56) References Cited

OTHER PUBLICATIONS

Zhang, F., Ed., et al., "RSVP-TE Extensions to Establish Associated Bidirectional LSP," draft-zhang-mpls-tp-rsvpte-ext-associated-lsp-01.txt, Oct. 25, 2010, 10 pages.

Zhang, F., Ed., et al., "RSVP-TE Extensions to Establish Associated Bidirectional LSP," draft-zhang-mpls-tp-rsvpte-ext-associated-lsp-02, Dec. 8, 2010, 12 pages.

Zhang, F., Ed., et al., "RSVP-TE Extensions to Establish Associated Bidirectional LSP," draft-zhang-mpls-tp-rsvpte-ext-associated-lsp-03, Feb. 25, 2011, 13 pages.

Office Action dated Dec. 14, 2011, 7 pages, U.S. Appl. No. 12/177,368, filed Jul. 22, 2008.

Office Action dated Oct. 11, 2011, 13 pages, U.S. Appl. No. 12/177,368, filed Jul. 22, 2008.

Office Action dated Jul. 19, 2011, 7 pages, U.S. Appl. No. 12/177,368, filed Jul. 22, 2008.

Office Action dated Mar. 17, 2011, 13 pages, U.S. Appl. No. 12/177,368, filed Jul. 22, 2008.

Notice of Allowance dated Mar. 7, 2012, 9 pages, U.S. Appl. No. 12/177,368, filed Jul. 22, 2008.

* cited by examiner

DISTRIBUTING WAVELENGTH COMPATIBLE WITH SIGNALING PROTOCOLS

CROSS-REFERENCE TO RELATED APPLICATIONS

The present application is a continuation of U.S. patent application Ser. No. 12/177,368 filed Jul. 22, 2008 by Bernstein et al. and entitled "Distributing Wavelength Compatible with Signaling Protocols," which claims the benefit of U.S. Provisional Patent Application No. 60/968,191 filed Aug. 27, 2007 by Bernstein et al. and entitled "Method for Distributing Wavelength Compatible with Modern Signaling Protocols," both of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wavelength division multiplexing (WDM) is one technology that is envisioned to increase bandwidth capability and enable bidirectional communications in optical networks. In WDM networks, multiple data signals can be transmitted simultaneously between network elements (NEs) using a single fiber. Specifically, the individual signals may be assigned different transmission wavelengths so that they do not interfere or collide with each other. The path that the signal takes through the network is referred to as the lightpath. One type of WDM network, a wavelength switched optical network (WSON), seeks to switch the optical signals with fewer optical-electrical-optical (OEO) conversions along the lightpath, e.g. at the individual NEs, than existing optical networks.

One of the challenges in implementing WDM networks is the determination of the routing or path assignment and wavelength assignment (RWA) for the various signals that are being transported through the network at any given time. The RWA may be implemented in a single step or in two separate steps comprising routing or path assignment and wavelength assignment (WA). When implemented separately, the path assignment may be implemented by a path computation element (PCE) while the WA may be distributed among the NEs along the path using a signaling protocol and a wavelength selection scheme, such as random, first available, most used, or least loaded wavelength selection. However, such wavelength selection schemes may require accessing global network information or forwarding excessive WA related information.

SUMMARY

In one embodiment, the disclosure includes an apparatus, comprising a first node configured to communicate with a second node to generate a wavelength assignment, wherein the first node is configured to send a wavelength availability information to the second node.

In another embodiment, the disclosure includes a network component, comprising at least one processor configured to implement a method, comprising receiving a wavelength availability information, and updating the wavelength availability information using a local wavelength availability information.

In yet another embodiment, the disclosure includes a method, comprising acquiring a local wavelength assignment information, calculating a local wavelength availability information, and transmitting the local wavelength availability information to a subsequent network element on a lightpath.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for a distributed WA for a plurality of NEs along a path that communicates wavelength availability information between the NEs. Specifically, wavelength availability information may be created at a first node along the path and forwarded to the next NE in the path. The next NE may update the wavelength availability information using its local wavelength availability information and forward the updated wavelength information to the next NE along the path. This process is repeated at each NE until there are no available wavelengths or the NE is the last NE in the path. The last NE in the path may use the wavelength availability information and a wavelength selection approach to reserve a wavelength along the path. The reserved wavelength may be communicated back to the NEs along the path so that their wavelength availability information can be updated.

Figure 1:
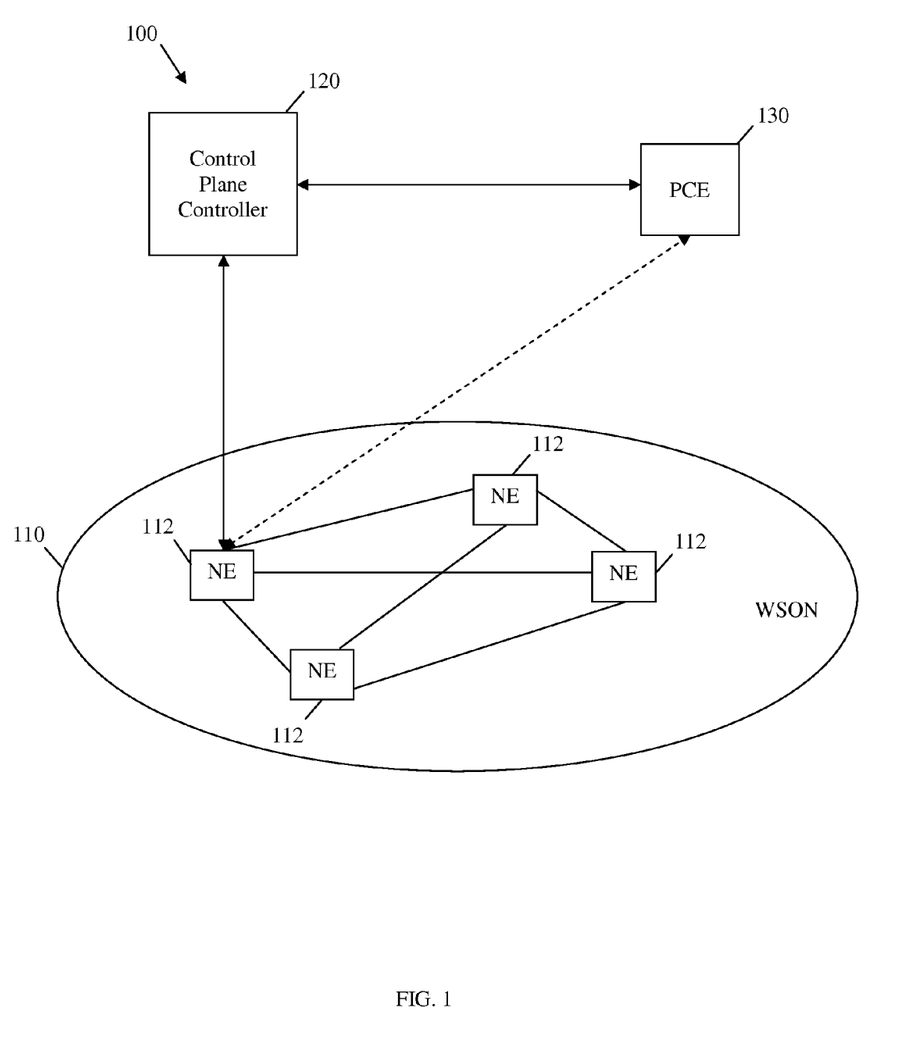
FIG. 1 is a schematic diagram of an embodiment of a WSON system.

FIG. 1 illustrates one embodiment of a WSON system 100. The system 100 may comprise a WSON 110, a control plane controller 120, and a PCE 130. The WSON 110, control plane controller 120, and PCE 130 may communicate with each other via optical, electrical, or wireless means. The WSON 110 may comprise a plurality of NEs 112 coupled to one another using optical fibers. In an embodiment, the optical fibers may also be considered NEs 112. The optical signals may be transported through the WSON 110 over lightpaths that may pass through some of the NEs 112. In addition, some of the NEs 112, for example those at the ends of the WSON 110, may be configured to convert between electrical signals from external sources and the optical signals used in the WSON 110. Although four NEs 112 are shown in the WSON 110, the WSON 110 may comprise any number of NEs 112.

The WSON 110 may be any optical network that uses active or passive components to transport optical signals. The WSON 110 may implement WDM to transport the optical signals through the WSON 110, and may comprise various optical components as described in detail below. The WSON 110 may be part of a long haul network, a metropolitan network, or a residential access network.

The NEs 112, also referred to as nodes, may be any devices or components that transport signals through the WSON 110. In an embodiment, the NEs 112 consist essentially of optical processing components, such as line ports, add ports, drop ports, transmitters, receivers, amplifiers, optical taps, and so forth, and do not contain any electrical processing components. Alternatively, the NEs 112 may comprise a combination of optical processing components and electrical processing components. At least some of the NEs 112 may be configured with wavelength converters, optical-electrical (OE) converters, electrical-optical (EO) converters, OEO converters, or combinations thereof. However, it may be advantageous for at least some of the NEs 112 to lack such converters as such may reduce the cost and complexity of the WSON 110. In specific embodiments, the NEs 112 may comprise optical cross connects (OXCs), photonic cross connects (PXCs), type I or type II reconfigurable optical add/drop multiplexers (ROADMs), wavelength selective switches (WSSs), fixed optical add/drop multiplexers (FOADMs), or combinations thereof.

The NEs 112 may be coupled to each other via optical fibers, also referred to as links. The optical fibers may be used to establish optical links and transport the optical signals between the NEs 112. The optical fibers may comprise standard single mode fibers (SMFs) as defined in ITU-T standard G.652, dispersion shifted SMFs as defined in ITU-T standard G.653, cut-off shifted SMFs as defined in ITU-T standard G.654, non-zero dispersion shifted SMFs as defined in ITU-T standard G.655, wideband non-zero dispersion shifted SMFs as defined in ITU-T standard G.656, or combinations thereof. These fiber types may be differentiated by their optical impairment characteristics, such as attenuation, chromatic dispersion, polarization mode dispersion, four wave mixing, or combinations thereof. These effects may be dependent upon wavelength, channel spacing, input power level, or combinations thereof. The optical fibers may be used to transport WDM signals, such as course WDM (CWDM) signals as defined in ITU-T G.694.2 or dense WDM (DWDM) signals as defined in ITU-T G.694.1. All of the standards described herein are incorporated herein by reference.

The control plane controller 120 may coordinate activities within the WSON 110. Specifically, the control plane controller 120 may receive optical connection requests and provide lightpath signaling to the WSON 110 via an Interior Gateway Protocol (IGP) such as Generalized Multi-Protocol Label Switching (GMPLS), thereby coordinating the NEs 112 such that data signals are routed through the WSON 110 with little or no contention. In addition, the control plane controller 120 may communicate with the PCE 130 using PCE Protocol (PCEP), provide the PCE 130 with information that may be used for the RWA, receive the RWA from the PCE 130, and/or forward the RWA to the NEs 112. The control plane controller 120 may be located in a component outside of the WSON 110, such as an external server, or may be located in a component within the WSON 110, such as a NE 112.

The PCE 130 may perform all or part of the RWA for the WSON system 100. Specifically, the PCE 130 may receive the wavelength or other information that may be used for the RWA from the control plane controller 120, from the NEs 112, or both. The PCE 130 may process the information to obtain the RWA, for example, by computing the routes, e.g. lightpaths, for the optical signals, specifying the optical wavelengths that are used for each lightpath, and determining the NEs 112 along the lightpath at which the optical signal should be converted to an electrical signal or a different wavelength. The RWA may include at least one route for each incoming signal and at least one wavelength associated with each route. The PCE 130 may then send all or part of the RWA information to the control plane controller 120 or directly to the NEs 112. To assist the PCE 130 in this process, the PCE 130 may comprise a global traffic-engineering database (TED), a RWA information database, an optical performance monitor (OPM), a physical layer constraint (PLC) information database, or combinations thereof. The PCE 130 may be located in a component outside of the WSON 110, such as an external server, or may be located in a component within the WSON 110, such as a NE 112.

In some embodiments, the RWA information may be sent to the PCE 130 by a path computation client (PCC). The PCC may be any client application requesting a path computation to be performed by the PCE 130. The PCC may also be any network component that makes such a request, such as the control plane controller 120, or any NE 112, such as a ROADM or a FOADM.

Figure 2:
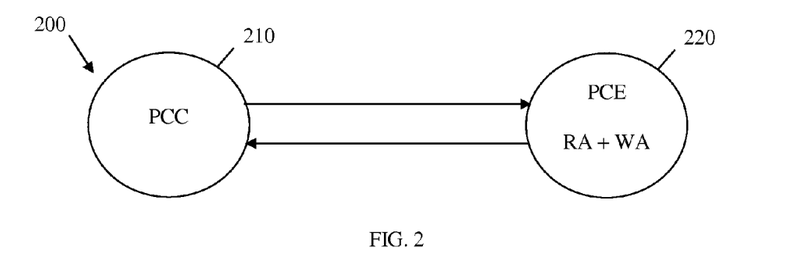
FIG. 2 is a schematic diagram of an embodiment of a combined RWA architecture.

FIG. 2 illustrates an embodiment of a combined RWA architecture 200. In the combined RWA architecture 200, the PCC 210 communicates the RWA request and the required information to the PCE 220, which implements both the routing assignment and the wavelength assignment functions using a single computation entity, such as a processor. For example, the processor may process the RWA information using a single or multiple algorithms to compute the lightpaths as well as to assign the optical wavelengths for each lightpath. The amount of RWA information needed by the PCE 220 to compute the RWA may vary depending on the algorithm used. If desired, the PCE 220 may not compute the RWA until sufficient network links are established between the NEs or when sufficient RWA information about the NEs and the network topology is provided. The combined RWA architecture 200 may be preferable for network optimization, smaller WSONs, or both.

Figure 3:
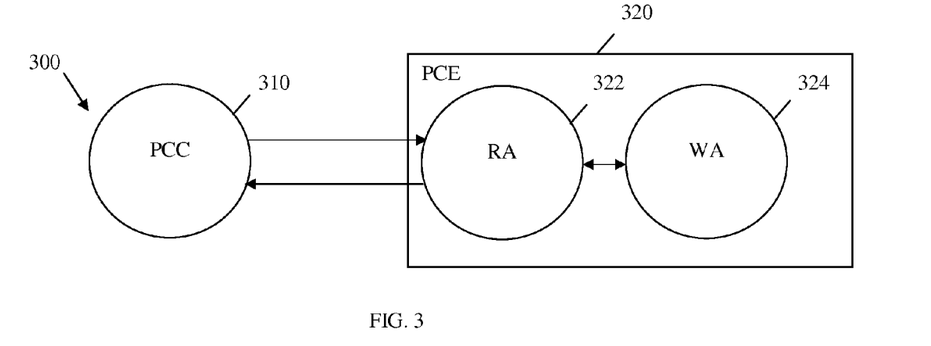
FIG. 3 is a schematic diagram of an embodiment of a separated RWA architecture.

FIG. 3 illustrates an embodiment of a separated RWA architecture 300. In the separated RWA architecture 300, the PCC 310 communicates the RWA request and the required information to the PCE 320, which implements both the routing function and the wavelength assignment function using separate computation entities, such as processors 322 and 324. Alternatively, the separated RWA architecture 300 may comprise two separate PCEs 320 each comprising one of the processors 322 and 324. Implementing routing assignment and wavelength assignment separately may offload some of the computational burden on the processors 322 and 324 and reduce the processing time. In an embodiment, the PCC 310 may be aware of the presence of only one of two processors 322, 324 (or two PCEs) and may only communicate with that processor 322, 324 (or PCE). For example, the PCC 310 may send the RWA information to the processor 322, which may compute the lightpath routes and forward the routing assignment to the processor 324 where the wavelength assignments are performed. The RWA may then be passed back to the processor 322 and then to the PCC 310. Such an embodiment may also be reversed such that the PCC 310 communicates with the processor 324 instead of the processor 322.

In either architecture 200 or 300, the PCC may receive a route from the source to destination along with the wavelengths, e.g. GMPLS generalized labels, to be used along portions of the path. The GMPLS signaling supports an explicit route object (ERO). Within an ERO, an ERO label sub-object can be used to indicate the wavelength to be used at a particular NE. In cases where the local label map approach is used, the label sub-object entry in the ERO may have to be translated.

Figure 4:
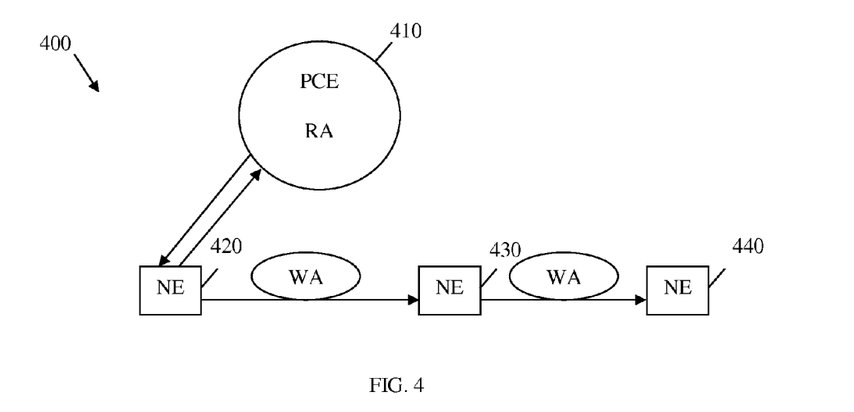
FIG. 4 is a schematic diagram of an embodiment of a distributed RWA architecture.

FIG. 4 illustrates a distributed wavelength assignment architecture 400. In the distributed wavelength assignment architecture 400, the PCE 410 may receive some or all of the RWA information from the NEs 420, 430, and 440, perhaps via direct link, and implements the routing assignment. The PCE 410 then directly or indirectly passes the routing assignment to the individual NEs 420, 430, and 440, which assign the wavelengths at the local links between the NEs 420, 430, and 440 based on local information. Specifically, the NE 420 may receive local RWA information from the NEs 430 and 440 and send some or all of the RWA information to the PCE 410. The PCE 410 may compute the lightpaths using the received RWA information and send the list of lightpaths to the NE 420. The NE 420 may use the list of lightpaths to identify the NE 430 as the next NE in the lightpath. The NE 420 may establish a link to the NE 430 and use the received local RWA information that may comprise additional constraints to assign a wavelength for transmission over the link. The NE 430 may receive the list of lightpaths from the NE 420, use the list of lightpaths to identify the NE 440 as the next NE in the lightpath, establish a link to the NE 440, and assign the same or a different wavelength for transmission over the link. Thus, the signals may be routed and the wavelengths may be assigned in a distributed manner between the remaining NEs in the network. Assigning the wavelengths at the individual NEs may reduce the amount of RWA information that has to be sent to the PCE 410.

Figure 5:
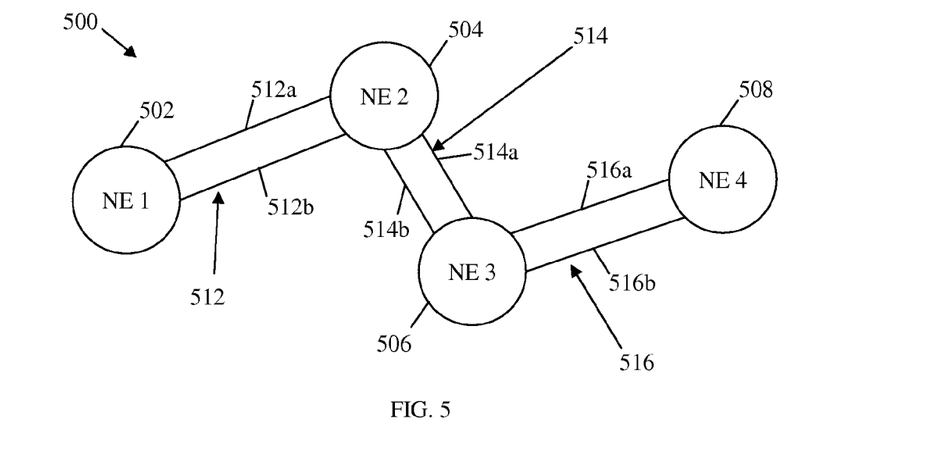
FIG. 5 is a schematic diagram of an embodiment of a WSON architecture with multiple links.

FIG. 5 illustrates an embodiment of a WSON architecture 500 comprising a plurality of NEs coupled to one another via a plurality of links. While the NEs may be coupled to each other via any number of links, in FIG. 5 a first NE 502 may be coupled to a second NE 504 via a first link 512 comprising fibers 512a and 512b. Similarly, the second NE 504 may be coupled to a third NE 506 via a second link 514 comprising fibers 514a and 514b, and the third NE 506 may be coupled to a fourth NE 508 via a third link 516 comprising fibers 516a and 516b. For each of the fibers of the first link 512, the second link 514, and the third link 516, a plurality of wavelengths, such as WDM channels, may be used to transport optical signals between the NEs. Further, for each of the fibers, the optical signals may be transported using the same or different wavelengths or wavelength channels between the NEs.

The assignment of wavelengths or wavelength channels to the links may be referred to as the wavelength assignment information. The assignment of the wavelength channels to each link may be represented using a wavelength assignment matrix or a wavelength usage matrix, where each row corresponds to a link, each column corresponds to a wavelength channel, and each element indicates the number of fibers using the wavelength or wavelength channel in the link. For example, assume that the fibers in the first link 512 may each support eight wavelength channels, where the first and fifth channel are assigned to both fibers, the third, fourth, sixth, and eighth channel are assigned to one of the two fibers, and the remaining channels are not assigned. Similarly, the fibers in the second link 514 may each support eight wavelength channels, where the fourth and eighth channel are assigned to both fibers, the second, third, and sixth channel are assigned to one of the two fibers, and the remaining channels are not assigned. Likewise, the fibers in the third link 516 may each support eight wavelength channels, where the third channel are assigned to both fibers, the first, second, fourth, fifth, and sixth channel are assigned to one of the two fibers, and the remaining channels are not assigned. In such a case, the wavelength usage matrix, $D_{ij}$ for FIG. 5 is $$D_{ij} = \begin{bmatrix} 2 & 0 & 1 & 1 & 2 & 1 & 0 & 1 \\ 0 & 1 & 1 & 2 & 0 & 1 & 0 & 2 \\ 1 & 1 & 2 & 1 & 1 & 1 & 0 & 0 \end{bmatrix},$$

where each row, l, corresponds to a link, each column, j, corresponds to a wavelength or wavelength channel, and each element indicates the number of occurrences where the wavelength or wavelength channel is used on the fibers in the link.

Further, a wavelength availability information may be obtained by subtracting the wavelength usage matrix from the number of fibers in each link, $M_l$. The difference, which may be represented by a wavelength availability matrix ($M_l$-$D_{ij}$), may indicate the availability of fibers for each channel to transport the optical signals at each link. Since the first link 512, the second link 514, and the third link 516 may each comprise two fibers (i.e. $M_l$=2), the wavelength availability matrix is $$M_1 - D_{ij} = \begin{bmatrix} 0 & 2 & 1 & 1 & 0 & 1 & 2 & 1 \\ 2 & 1 & 1 & 0 & 2 & 1 & 2 & 0 \\ 1 & 1 & 0 & 1 & 1 & 1 & 2 & 2 \end{bmatrix},$$

where each row, l, corresponds to a link, each column, j, corresponds to a wavelength or wavelength channel, and each element indicates the number of available assignment options or possibilities for the wavelength or wavelength channel assignment in the link.

As shown in the first row of the wavelength availability matrix, the second and seventh wavelength channels may be available over both fibers in the first link 512, the third, fourth, sixth, and eighth wavelength channels may be available over one, but not both, of the fibers in the first link 512, and the first and fifth wavelength channels may not be available in either fiber in the first link 512. As shown in the second row of the wavelength availability matrix, the first, fifth, and seventh wavelength channels may be available over both fibers in the second link 514, the second, third, and sixth wavelength channels may be available over one, but not both, of the fibers in the second link 514, and the fourth and eighth wavelength channels may not be available in either fiber in the second link 514. As shown the third row of the wavelength availability matrix, the seventh and eighth wavelength channels may be available over both fibers in the third link 516, the first, second, fourth, fifth, and sixth wavelength channels may be available over one, but not both, of the fibers in the third link 516, and the third wavelength channel may not be available in either fiber in the third link 516.

The wavelength availability information for the NEs along the path may be used to assign a suitable wavelength to the links according to a wavelength selection approach or algorithm. For instance, the wavelength availability matrix may be processed at the last NE in the path, to select a random, a least assigned, or a most assigned wavelength at the links. The selected wavelength may then be forwarded to the remaining NEs. For example, the least or most assigned wavelength may be obtained by first taking a minimum of each column in the wavelength availability matrix. Hence, the least loaded wavelength at the links may correspond to the column with the largest minimum, which represents the largest number of available assignment options for the wavelength. On the other hand, the most loaded wavelength may correspond to the column with the smallest minimum, which represents the smallest number of available assignment options for the wavelength.

As such, in order to achieve distributed WA, it may be required to combine, communicate, or store the wavelength availability information for the NEs. For example, obtaining and processing the wavelength availability matrix at the last NE may require forwarding the wavelength availability information for all the previous NEs along the path to the last NE. Such requirement may impose additional cost or burden on the distributed WA process, which may further increase as the number of NEs, links, or both along the path increases.

Figure 6:
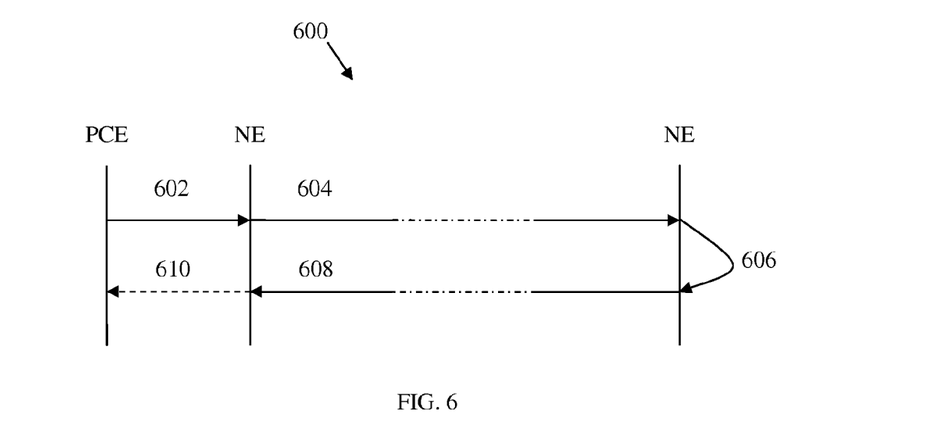
FIG. 6 is a protocol diagram of an embodiment of distributed WA communications.

FIG. 6 illustrates an embodiment of a distributed WA communications method 600 between a plurality of NEs. The distributed WA communications method 600 may be implemented using any suitable signaling protocol, such as GMPLS, or similar messaging protocol to exchange information between the NEs. In the method 600, the PCE may receive a path computation request from an NE or other PCC (not shown). The request may include lightpath constraints such as a RWA computation option, a route parameter, a wavelength selection preference, an optimization degree, a timeliness characteristic, a duration, or combinations thereof. The PCE may calculate or locate a path through the network that meets the lightpath constraints. For example, the PCE may calculate a path comprising a plurality of NEs coupled to each other via a plurality of links, for example as in the case of the WSON architecture above. The PCE may send a message comprising the routing assignment, such as a path computation reply 602, to the first or source NE in the calculated path. In some embodiments, the path computation reply 602 may comprise an initial or suggested wavelength assignment, which may be used, updated or changed when implementing distributed WA among the NEs.

Upon receiving the path computation reply 602, the first or source NE may implement a distributed WA with the other NEs in the path. Specifically, the NEs may each forward, one at a time, a path message 604 comprising updated wavelength availability information. The last or destination NE in the path may receive the path message 604, assign a wavelength to the path 606, and send back a reserve message 608 comprising the wavelength assignment to the previous NEs. In the case where no wavelength can be assigned to the path, for example when no common wavelength is available at all the NEs, the destination NE or any other NE making such a determination may send back a path error message to the previous NEs to inform the NEs that the distributed WA is blocked. Additionally, the source node may send a confirmation message 610 to the PCE to inform the PCE whether a path wavelength assignment has been established or blocked.

Figure 7:
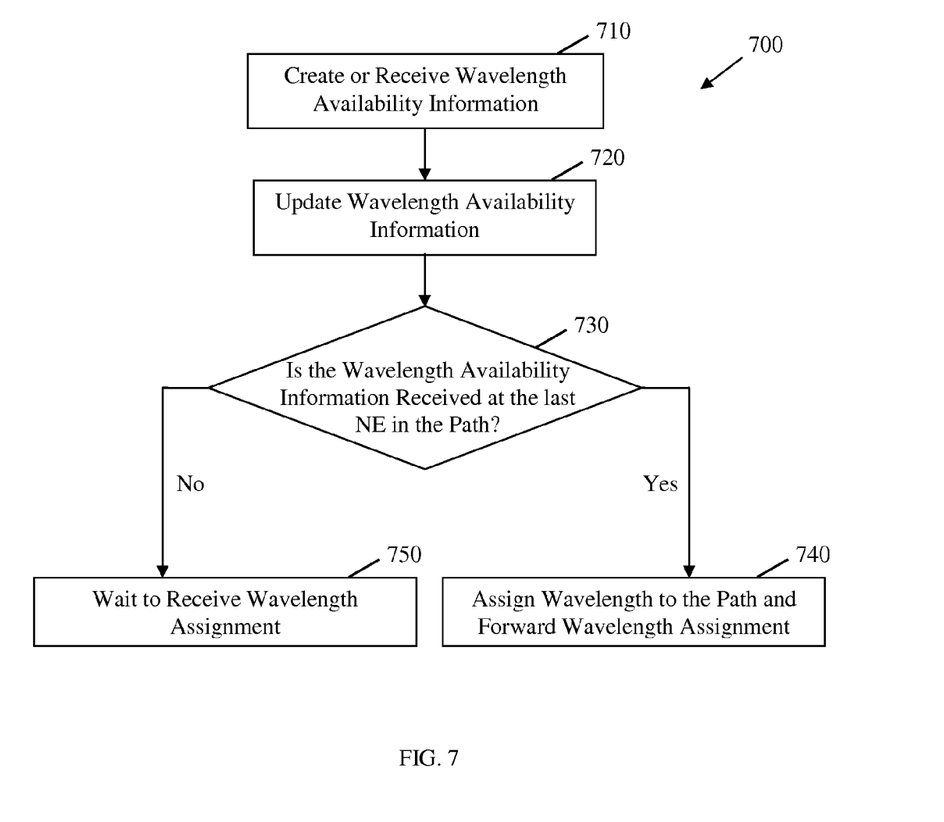
FIG. 7 is a schematic diagram of an embodiment of a distributed WA method.

FIG. 7 illustrates one embodiment of a distributed WA method 700 which may be implemented to forward and update the wavelength availability at the NEs and assign a wavelength to the path using the wavelength availability. Specifically, the wavelength availability information may be forwarded via signaling or messaging and updated at each NE starting from the source NE and ending at the destination NE, for example using the distributed WA communications method. At the last NE in the path, a wavelength may be selected based on a wavelength selection approach or algorithm to assign a suitable, favorable, or optimal wavelength to the path along the NEs. The selected wavelength may then be forwarded back to each of the NEs from the destination NE to the source NE. By using the local wavelength availability information at the NEs and communicating the wavelength availability between the NEs, accessing or storing the NEs' wavelength information at a network database or processing the wavelength information at a management plane level becomes optional and may not be needed for distributed WA.

At block 710, the method 700 may create or receive the wavelength availability information. The wavelength availability information may comprise a list of the wavelengths available at the previous NEs. For instance, the wavelength availability may be received in the form of a single row matrix comprising at each column the number of fibers that are available to transport the optical signals for each wavelength across all of the previous links. If the NE is a source NE, the NE creates the wavelength availability information using its local wavelength availability information, perhaps using a suggested or restricted wavelength set. If the NE is not the source NE, the NE receives the wavelength availability information from the previous NE in the path. In such a case, the wavelength availability information may comprise the available wavelengths for all previous NEs in the path.

At block 720, the method 700 may update the wavelength availability information using the NE's available wavelength information. In an embodiment, the NE's local available wavelengths, i.e., on the link between the present NE and the next NE in the path, may be compared with the received available wavelengths. The wavelength available information may then be updated to indicate one or more common available wavelengths between the received wavelength availability information and the local availability information. In another embodiment, the wavelength availability matrix or row associated with the link may be established, as shown above. The wavelength availability matrix may be compared to the wavelength availability matrix received from the previous NE, and the wavelength availability information may be updated by taking a minimum between the two matrices. The NE may then send the updated wavelength assignment information to the next NE in the path.

At block 730, the method 700 may determine whether the wavelength availability information has been received and updated at the destination or last NE in the path. In embodiments, the path assignment information may be forwarded along with the wavelength availability information via signaling between the NEs. In such a case, the method 700 may use the path assignment information from the PCE, which may include the NEs' network addresses, to determine whether the NE is the last NE indicated in the path assignment. The method 700 may proceed to block 740 if the condition in block 730 is met, i.e. if the NE is the last NE in the path. Otherwise, the method 700 may proceed to block 750.

At block 740, the method 700 may process the updated wavelength availability information based on a wavelength selection approach to select one wavelength that may be assigned to all the NEs (and the corresponding links) in the path. For instance, a random, a first, a most used, or a least loaded (LL) wavelength may be selected from the list of updated available wavelengths at the destination NE. The selected wavelength may be sent back to the previous NE in the path via signaling, for example using the wavelength assignment reply, which may be in turn forwarded between each of the NEs to the source NE. Alternatively, when no wavelength may be selected or assigned, for example when no wavelength in common with all the NEs is available, the wavelength assignment is blocked and an error message may be sent back instead.

At block 750, the method 700 may wait at the NE to receive the wavelength assignment reply or the error message indicating that the wavelength assignment is blocked. When the NE receives the wavelength assignment reply, the selected wavelength is assigned to the NE link and the NE's wavelength availability information may be updated to account for the assigned wavelength, for example, by changing the status of the selected wavelength from available to assigned. In an embodiment, the NE may be configured to wait for a wavelength assignment reply for a predetermined period of time, such that the NE may return to normal network operations when the time expires before receiving the wavelength assignment reply or, alternatively, when receiving an error message.

Figure 8:
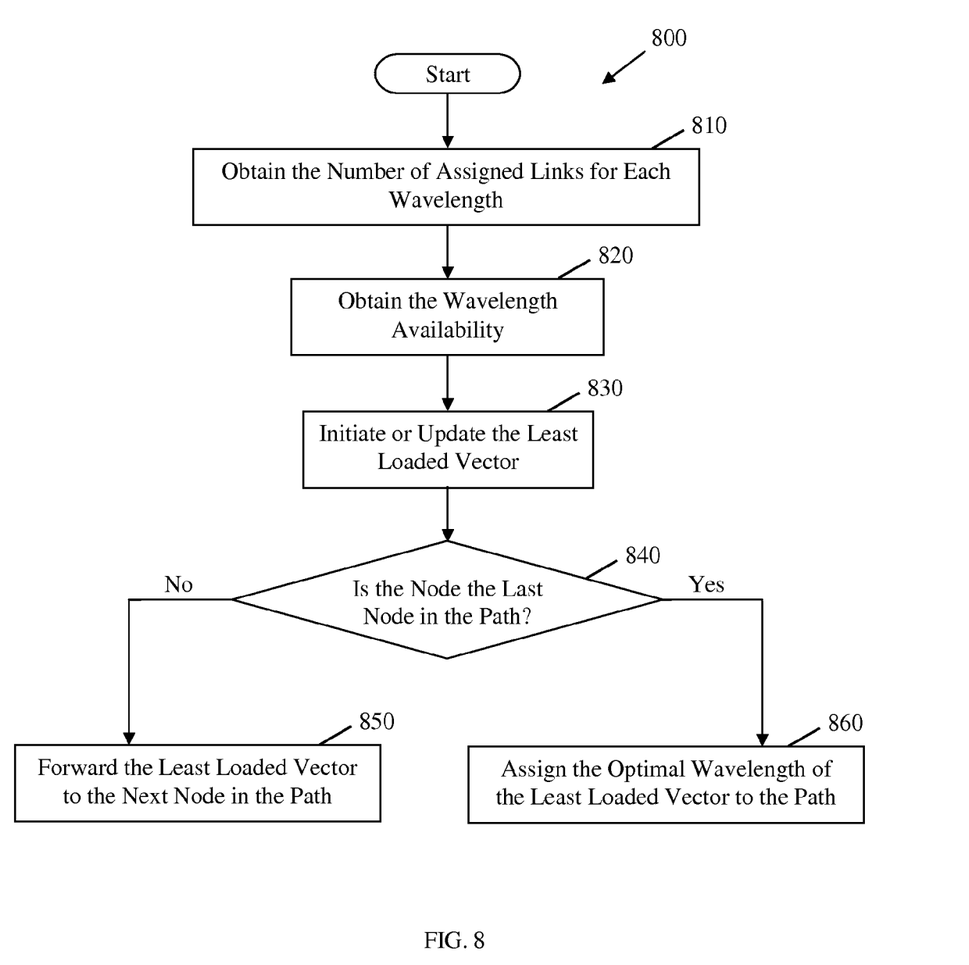
FIG. 8 is a schematic diagram of an embodiment of a least loaded wavelength selection method.

FIG. 8 illustrates one embodiment of a LL wavelength selection method 800, which may be implemented in for distributed WA. Specifically, the LL wavelength selection method 800 may be implemented at any NE in the path. The method 800 may obtain the NE's local wavelength availability, obtain a LL row matrix or vector using the local wavelength availability, and forward the LL vector. When the destination NE receives the LL vector, a wavelength may be assigned using the LL vector.

At block 810, the method 800 may obtain the local assigned wavelength information. Specifically, the NE may obtain the number of assigned links, or alternatively the number of assigned fibers in each link, for each wavelength or wavelength channel. For instance, the number of assigned links or fibers may be combined in the form of a single-row local wavelength usage matrix with each column corresponding to one of the wavelengths or channels. In such a case, the local wavelength usage matrices for the first link NE 502, the second NE 504, and the third NE 506 of FIG. 5 are [2 0 1 1 2 1 0 1], [0 1 1 2 0 1 0 2], and [1 1 2 1 1 1 0 0], respectively. Each node, e.g. NE 502, NE 504, and NE 506, is aware of the wavelength usage or for its egress ports, but may be unaware of the other node's wavelength usages.

At block 820, the method 800 may initiate or obtain the local wavelength availability using the assigned wavelength information. For instance, a local wavelength availability matrix may be established by subtracting the local wavelength usage matrix from the number of links or fibers for each wavelength or channel at each node. As such, the local wavelength availability matrices for the first link NE 502, the second NE 504, and the third NE 506 of FIG. 5 are [0 2 1 1 0 1 2 1], [2 1 1 0 2 1 2 0], and [1 1 0 1 1 1 2 2], respectively. Again, each node is aware of its wavelength availability, but may be unaware of the other nodes' wavelength availability.

At block 830, the method 800 may initiate or obtain the LL vector using the local wavelength availability information. The LL vector may comprise the minimum number of available or unassigned links or fibers for each wavelength or channel. For instance, the method 800 may use the local wavelength availability matrix to obtain the LL vector when the NE is the source NE. For example, in the WSON architecture 500, the LL vector at the first NE 502 may be equal to the established local wavelength availability matrix, [0 2 1 1 0 1 2 1].

Alternatively, when the NE is not the source NE, the LL vector may be updated by combining the local wavelength availability matrix with the LL vector received from the previous NE in the path. Specifically, the LL vector may be obtained by taking a minimum of each column in the received LL vector and the local wavelength availability matrix. For example, in the a WSON architecture 500, the updated LL vector at the second NE 504 may be obtained by taking a minimum of the LL vector received from the first NE 502, [0 2 1 1 0 1 2 1], with the local wavelength availability matrix at the second NE 504, [2 1 1 0 2 1 2 0]. As such, the updated LL vector at the second NE 504 may be equal to [0 1 1 0 0 1 2 0]. Similarly, the updated LL vector at the third NE 506 may be taking a minimum of the LL vector received from the second NE 504, [0 1 1 0 0 1 2 0], with the local wavelength availability matrix, at the third NE 506, [1 1 0 1 1 1 2 2]. As such, the updated LL vector may be equal to [0 1 0 0 0 1 2 0]. In another embodiment of the method 800, block 830 may be combined with block 820 and/or block 810.

At block 840, the method 800 may determine whether the NE is the last NE in the path. For instance, the path assignment information forwarded from the PCE may be used to match the NE's network address or identification (ID) to the destination NE's address or ID. The method 800 may proceed to block 850 if the condition in block 840 is not met, i.e. if the NE is not the destination NE. Otherwise, the method 800 may proceed to block 860.

At block 850, the method 800 may forward the updated LL vector to the next NE in the path. The LL vector may be forwarded via a signaling protocol, such as GMPLS, messaging, or other communication protocol that may be established between the NEs.

At block 860, the method 800 may process the updated LL vector to obtain the path wavelength assignment. Based on the LL wavelength selection algorithm, the assigned wavelength may correspond to the LL vector column comprising the largest number of available links or fibers. For example, in the WSON architecture 500, the assigned wavelength at the fourth NE 508, which may be the destination NE, may correspond to the maximum entry in the updated LL vector from the third node 506, [0 1 0 0 0 1 2 0], which is equal to 2 at the seventh column. Hence, the seventh wavelength or channel corresponding to the seventh column may be assigned to transport the associated signal. As such, the method 800 may assign to the path the wavelength available over most links or fibers between the NEs. Accordingly, implementing the method 800 may improve balancing or distributing assigned wavelengths among the network paths.

In another embodiment, the method 800 may be based on a most used wavelength selection approach instead of LL wavelength selection. As such, the updated LL vector at the last NE may be processed such that the assigned wavelength may correspond to the column comprising the least number of available links or fibers. For example, in the WSON architecture 500, the assigned wavelength at the fourth NE 508 may correspond to the minimum non-zero entry in the updated LL vector from the third node 506, [0 1 0 0 0 1 2 0], which may be equal to one at the second or sixth column. Hence, the second or sixth wavelength or channel may be assigned. Alternatively, the assigned wavelength may correspond to the absolute minimum entry in the updated LL vector, which may be equal to zero at the first, third, fourth, fifth, or eighth column. Hence, the first, third, fourth, fifth, or eighth wavelength or channel may be assigned. As such, the method 800 may assign to the path the wavelength used over most links or fibers between the NEs.

In other embodiments, the assigned wavelength may correspond to the first column or random column of the updated LL vector at the last NE and the method 800 may be based on a first fit or random wavelength selection approach, respectively. In some embodiment, the method 800 may assign at the destination NE a path wavelength based on one of the wavelength selection approaches above as selected or determined by the PCE or operator.

Figure 9:
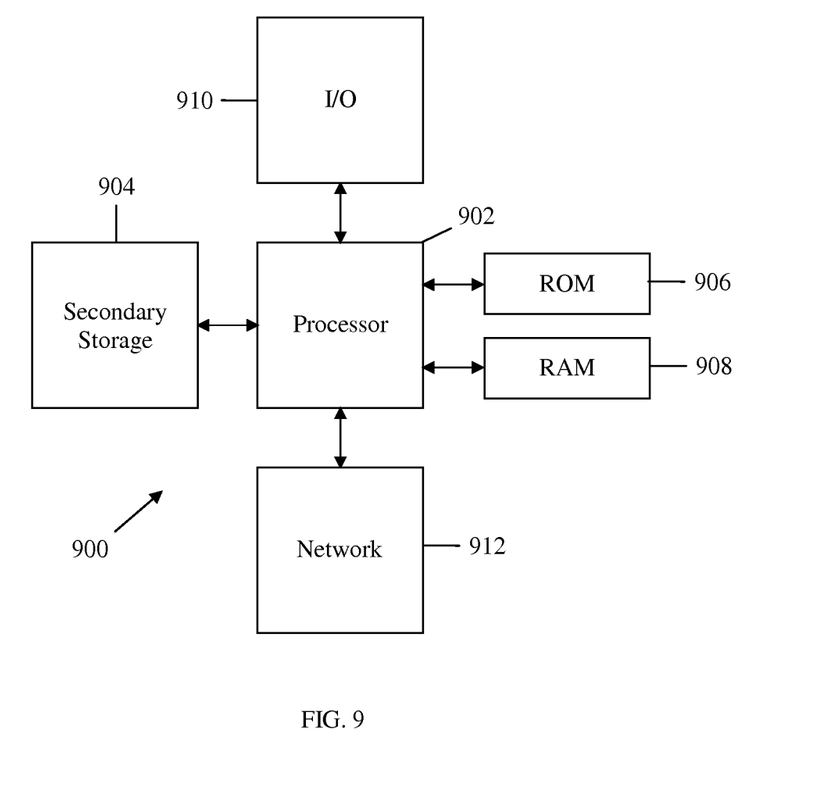
FIG. 9 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 9 illustrates a typical, general-purpose network component 900 suitable for implementing one or more embodiments of the components disclosed herein. The network component 900 includes a processor 902 (which may be referred to as a central processor unit or CPU) that is in communication with memory devices including secondary storage 904, read only memory (ROM) 906, random access memory (RAM) 908, input/output (I/O) devices 910, and network connectivity devices 912. The processor may be implemented as one or more CPU chips, or may be part of one or more application specific integrated circuits (ASICs).

The secondary storage 904 is typically comprised of one or more disk drives or tape drives and is used for non-volatile storage of data and as an over-flow data storage device if RAM 908 is not large enough to hold all working data. Secondary storage 904 may be used to store programs that are loaded into RAM 908 when such programs are selected for execution. The ROM 906 is used to store instructions and perhaps data that are read during program execution. ROM 906 is a non-volatile memory device that typically has a small memory capacity relative to the larger memory capacity of secondary storage 904. The RAM 908 is used to store volatile data and perhaps to store instructions. Access to both ROM 906 and RAM 908 is typically faster than to secondary storage 904.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network comprising:
a plurality of nodes along a path each comprising wavelength availability information,
wherein the nodes select a wavelength on a hop-by-hop basis, and
wherein the nodes comprise a first node that indicates a signal process by declaring its wavelength availability information as a least loaded matrix representing labels in a label object, at least one intermediate node that deletes some labels from the received least loaded matrix, and a last node that makes a final decision on a wavelength assignment among labels received through the signaling process,
wherein deleting some labels from the received least loaded matrix comprises combining the received least loaded matrix with a wavelength availability matrix that represents the wavelength availability information of the intermediate node, and
wherein combining the least loaded matrix with the wavelength availability matrix comprises taking the minimum of each column of the received least loaded matrix and of each corresponding column of the wavelength availability matrix.

2. The network of claim 1, wherein the wavelength assignment method is first fit.

3. The network of claim 1, wherein the wavelength assignment method is random.

4. The network of claim 1, wherein the wavelength assignment method is least loaded.

5. A network comprising:
a first node, a second node, and a third node wherein the first node, the second node, and the third node belong to a common lightpath,
wherein the first node is configured to communicate with the second node and the third node to generate a wavelength assignment,
wherein the first node is configured to receive a first wavelength availability information from the second node, evaluate the first wavelength availability information, and send a second wavelength availability information to the third node,
wherein evaluating the first wavelength availability information comprises creating a second wavelength availability information from the first wavelength availability information by removing all wavelengths that are not commonly available between the first node and the second node from the first wavelength availability information, and
wherein removing all wavelengths that are not commonly available between the first node and the second node comprises combining a least loaded vector of the received wavelength availability information and a vector of wavelength availability at the first node by taking a minimum of the vectors.

6. The network of claim 5 further comprising a wavelength switched optical network (WSON), and wherein the WSON comprises the first node, the second node, the third node, and the lightpath.

7. The network of claim 6, wherein the second node is a source node and is configured to generate or receive lightpath information that indicates the lightpath.

8. The network of claim 7 further comprising a path communications element (PCE), and wherein the PCE generates the lightpath information.

9. The network of claim 5, wherein the third node is a destination node, wherein the third node determines the wavelength assignment, and wherein the third node sends a wavelength reservation message comprising the wavelength assignment to the first node.

10. A system comprising:
a first network element (NE) and a second NE both positioned on a lightpath,
wherein the second NE is configured to receive wavelength availability information from the first NE,
wherein the second NE is further configured to update the wavelength availability information using local wavelength availability information by removing wavelengths that are not commonly available along the lightpath from the wavelength availability information, and
wherein updating the wavelength availability information using local wavelength availability information comprises combining a least loaded vector of the wavelength availability information and a vector of the local wavelength availability by taking a maximum of the vectors.

11. The system of claim 10 further comprising a third NE positioned on the lightpath such that the second NE is between the first NE and the third NE, and wherein the second NE is further configured to propagate the updated wavelength availability information to the third NE.

12. The system of claim 11, wherein at least one of the NEs is configured to select a wavelength assignment along the lightpath.

13. The system of claim 12, wherein the system comprises a plurality of links each with a plurality of channels, and wherein the wavelength assignment comprises a matrix of the channels and the links.

14. The system of claim 12, wherein the NE selecting the wavelength assignment is configured to generate a wavelength reservation message comprising the wavelength assignment and transmit the wavelength reservation method to one of the other NEs.

15. The system of claim 10, wherein one of the NEs is further configured to receive lightpath information and send an error message to a previous NE indicated by the lightpath information when there are no available wavelengths in the updated wavelength availability information.

16. The system of claim 10, wherein the wavelength availability information is updated using a least loaded wavelength selection algorithm.

17. A system comprising:
a first network element (NE) and a second NE both positioned on a lightpath,
wherein the second NE is configured to receive wavelength availability information from the first NE,
wherein the second NE is further configured to update the wavelength availability information using local wavelength availability information by removing wavelengths that are not commonly available along the lightpath from the wavelength availability information,
wherein the wavelength availability information is updated using a least loaded wavelength selection algorithm,
wherein updating the wavelength availability information using local wavelength availability information comprises combining a least loaded vector of the wavelength availability information and a vector of the local wavelength availability, and
wherein combining the vectors comprises taking a minimum of the vectors.

* * * * *